United States Patent [19]

Melzer et al.

[11] Patent Number: 4,754,994
[45] Date of Patent: Jul. 5, 1988

[54] STUB FOR CONNECTING A HOSE AND ESPECIALLY FOR COOLANT HOSES IN INTERNAL COMBUSTION ENGINES

[75] Inventors: Hans H. Melzer, Pentling; Athanasios Michassouridis, Munich; Reiner Bachofner, Munich; Achim Espitte, Munich, all of Fed. Rep. of Germany

[73] Assignee: Bayerische Motoren Werke AG, Munich, Fed. Rep. of Germany

[21] Appl. No.: 45,850
[22] PCT Filed: Aug. 5, 1986
[86] PCT No.: PCT/EP86/00463
   § 371 Date: Apr. 8, 1987
   § 102(e) Date: Apr. 8, 1987
[87] PCT Pub. No.: WO87/00905
   PCT Pub. Date: Feb. 12, 1987

[30] Foreign Application Priority Data
Aug. 8, 1985 [DE] Fed. Rep. of Germany ....... 3528560

[51] Int. Cl.[4] .............................................. F16L 33/00
[52] U.S. Cl. .................................. 285/259; 285/252
[58] Field of Search ................ 285/256, 259, 252, 253

[56]   References Cited
   U.S. PATENT DOCUMENTS

| 2,198,996 | 4/1940 | Guarnaschelli | 285/256 X |
| 3,524,661 | 8/1970 | Farnam | 285/259 |
| 3,539,207 | 11/1970 | Harris | 285/256 |
| 4,544,187 | 10/1985 | Smith | 285/259 X |

FOREIGN PATENT DOCUMENTS 2851965 6/1982 Fed. Rep. of Germany.
792029 3/1958 United Kingdom.

Primary Examiner—Dave W. Arola
Attorney, Agent, or Firm—Barnes & Thornburg

[57] ABSTRACT

The invention relates to a stub support for connecting and supporting a hose connection wherein the stub has a rounded cross-section and is in configuration with peaks and valleys with steep tapering flanks facing the connection side of the stub and long tapering flanks facing the opposite direction.

2 Claims, 1 Drawing Sheet

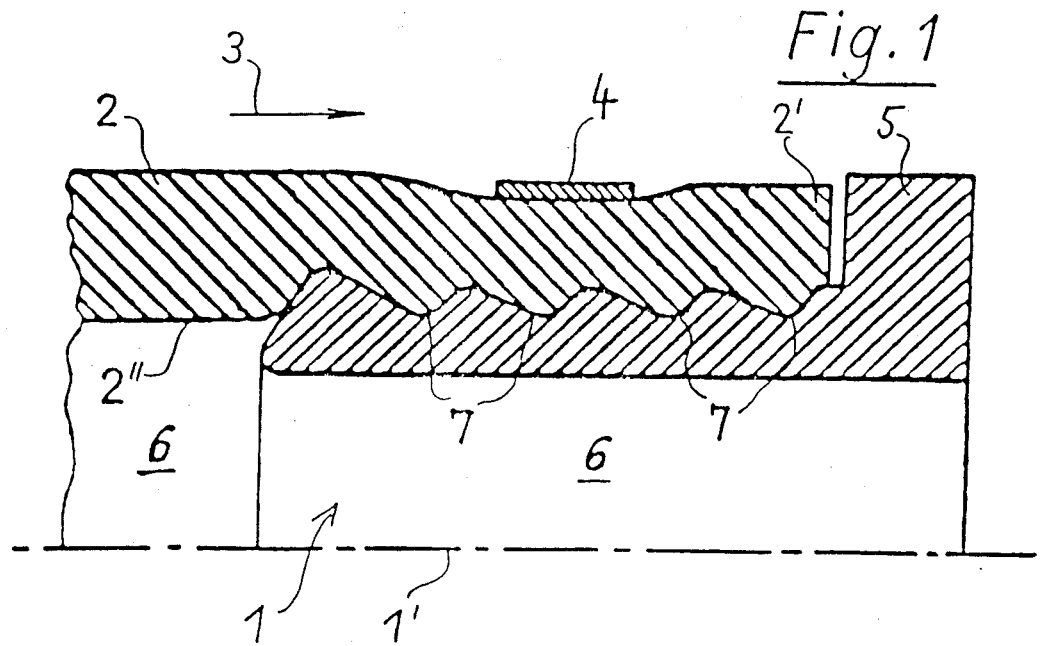
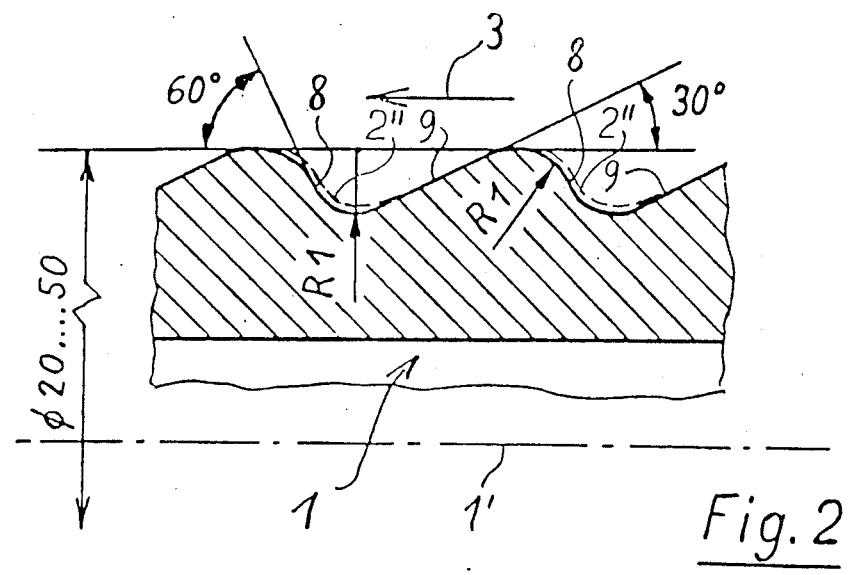

STUB FOR CONNECTING A HOSE AND ESPECIALLY FOR COOLANT HOSES IN INTERNAL COMBUSTION ENGINES

BACKGROUND AND SUMMARY OF THE INVENTION

The invention relates to a stub support for the connection of a hose ends, especially for coolant hoses of internal combustion engines, wherein the end of the stub connected to the hose is round in cross-section and has a plurality of annular grooves with steep tapering profile flanks facing the connection edge of the stub and long tapering profile flanks facing the opposite direction.

Stubs of a similar design are known from British Pat. No. 792,029 and German Pat. No. 28 51 965. The German Pat. No. 2,851,965 has radial flanks facing the end of the stub and barely rounded transitions to the groove peaks and valleys, which will destroy the interior of the hose under continuous loading. British Pat. No. 792 029 contains no information about the function of the annular groove profile shown. The relatively great depth of the annular grooves shown in German Pat. No. 28 51 965, as a result of the severe deformation of the interior of the hose, also promotes premature wear at the hose connection to the stub. The design of the groove profile described in German Pat. No. 28 51 965 with its radial flanks, is intended to ensure the explained but unrelated function of this hose connection, according to which the interior of the hose is supposed to abut the radial flank in a sealing fashion. However, since such an arrangement cannot be achieved by the sole action of a hose clamp, the fluid to be sealed off also penetrates into the annular gap which tapers outward, which is unavoidable in the area of the radial flank. Thus as the fluid pressure simultaneously builds up in this gap, no seat of the inner surface of the hose against the radial flank of the annular groove profile can be effected. The reliable sealing action of such stubs, as established in tests, with reversed saw-tooth profiles from that of the instant application, is based on the wedging action of the flat conical profile flanks in conjunction with the pull-off effect of the fluid pressure on the hose. The hose, even with loosened tensioning to the point of slippage, with elastic or plastic deformation, and/or with material shrinkage caused by a temperature drop, continues to be jammed against the flat conical profile flanks in a sealing fashion between the stub and the hose clamp.

An object of the instant invention is to design a stub with a profile of this general shape but with the annular grooves such, that both the sealing action remains assured and continuous loading without of destruction of the interior of the hose is achieved and hence elimination of premature failure of the hose mount is also achieved.

To achieve this object, the invention provides a support for the connection of a hose end, especially for coolant hoses of internal combustion engines, wherein the end of the stub connected to the hose is round in cross-section and has a plurality of annular grooves with steep tapering profile flanks facing the connection edge of the stub and long tapering profile flanks facing the opposite direction. The relatively shallow groove depth and the angle which is less steep by contrast to the 90° angle of a radial flank reduce the deformation of the interior of the hose to such a degree that its service life is no longer disadvantageously affected. The reliable sealing action described at the outset of the flat conical profile flanks arising from their wedging function, combined with the fluid pressure which pulls the hose toward the end of the stub remains unaffected and fully effective by the design of the steep profile flanks according to the invention.

The invention contemplates a shape and dimensions of the annular grooves which are both functional and especially advantageous from the manufacturing engineering standpoint and follow from the fact that the depth of the annular grooves on the stub, which makes up the saw-tooth connection between the hose and the stub, is on the order of 1 mm, the long tapering conical profile flanks of the grooves make an angle with the central axis of the stub of approximately 30°, the groove peaks and valleys of the saw-tooth profile are rounded with a radius of approximately 1 mm and wherein the peaks and grooves merge directly along the steep conical profile of the saw-tooth profile at an angle of approximately 60° with the axis of the stub. The transitions of the profile flanks will then have the maximum possible rounding to the depth of the annular grooves and to the angles of the profile flanks. The interior of the hose is consequently deformed and stressed to an extremely slight degree. In addition, rounding radii of 1 mm make possible the use of conventional machining tools which have the same rounding radii. The shallow depth of the annular grooves and their arrangement, finally, make possible a relatively thin wall for the stub, with high strength and the use of such stubs with the smallest possible spacings between adjacent stubs in view of the thicknesses of the hose walls.

These and other objects, features, and advantages of the present invention will become more apparent from the following description when taken in connection with the accompanying drawing which shows, for the purposes of illustration only, one emobdiment in accordance with the present invention, and wherein:

BRIEF DESCRIPTION OF THE DRAWINGS

FIG. 1 shows a stub with a hose end for fluid lines fastened by means of a hose clamp, as for example coolant lines of internal combustion engines, and FIG. 2 is a partial cross section of the stub according to FIG. 1, shown enlarged and in an oppositely facing direction to that shown in FIG. 1.

DETAILED DESCRIPTION OF THE DRAWINGS

Referring now to the drawings wherein like reference numerals are used to designate like parts and more particularly to FIG. 1, a hose 2 is shown pushed onto a stub 1 along the direction of arrow 3 and is fastened by means of a hose clamp 4 by radial tightening. Stub 1 is made of metal, plastic, or similar solid material. Hose 2 is made of a fabric-reinforced elastomer and is correspondingly elastically as well as partially plastically deformable. As a stop for hose end 2', stub 1 has a radial flange 5 which either serves also to fasten to another component, or is part of another component in which the fluid line 6 is continued from hose 2 and stub 1. Stub 1 has a plurality of annular grooves 7 for the positive and permanent fastening of hose 2, said grooves having a rounded saw-tooth profile. In the case of a stub 1 with an outside diameter of approximately 20 to 50 mm, the depth of annular grooves 7 as well as the rounding radii R1 of the peaks and valleys of the grooves is 1 mm each. In this way, at steep tapering profile flanks 8, there is a direct transition from the convex and concave rounding radii R1 with one another at an angle of 60° to central axis 1' of stub 1. For the long tapering profile flanks 9, an angle of 30° to central axis 1', produces relatively large conical support surfaces for a hose interior 2" (shown in dotted lines in FIG. 2).

When the hose fastening is subject to pressure by a fluid which acts both on the interior of the hose 2" in an expanding fashion and also as a pulling-off force against the pushing-on direction according to arrow 3, hose 2 is held in annular grooves 7 by hose clamp 4 and is reliably sealed by the pressing force on the outer convex rounding radii R1. The shallow depth and gentle rounding radii of annular grooves 7, 1 mm each, require only a very slight deformation of hose interior 2", so that a long service life for the hose connection is achieved. The conical supporting surfaces of flat long tapering profile flanks 9, which taper off counter to the hose pushing-on direction as indicated by arrow 3, and hence rise in the direction of the pulling-off force exerted by the fluid pressure, ensure a reliable sealing action for the hose connection even when the tensioning of hose 2 between stub 1 and hose clamp 4 decreases as a result of plastic deformation of hose 2 and/or shrinkage caused by the action of cold medium to the hose. Then the pulling-off force pulls hose inner surface 2" against the conical supporting surfaces of flat long tapering profile flanks 9, thus wedging hose 2 between stub 1 and hose clamp 4. Hose interior 2" as shown by dashed lines 2" in FIG. 2 does lift off the steep tapering profile flanks 8 and the rounding radii R1 of the groove valleys, but without losing the sealing action prior to complete sliding off of tube 2 from stub 1 as a result of excessive aging of the hose material.

The saw-tooth profile of annular grooves 7 or stub 1 also has advantages from the manufacturing engineering standpoint. It is easy to manufacture by virtue of its rounding radii R1 with conventional shaping and copying lathe tools. This is even possible for stubs located close together which have a spacing which is the same as or less than the sum of the two wall thicknesses of the hoses to be fastened thereon. Shaping in plastic and other injectable and moldable materials is advantageously possible so that such stubs can readily be formed on various components such as radiators, thermostat housings, coolant pump housings, and line branching components.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

What is claimed is:

1. A stub for connection to coolant hoses of internal combustion engines, comprising a stub means having a rounded portion and a bore extending therethrough, having a central axis
   with a plurality of annual grooves defined by peaks and valleys along at least a length portion of the rounded portion,
   said grooves having an approximately saw-toothed shape profile, with steep tapering profile flanks facing away from a free end of the stub and connected to a long tapering, conical profile facing in the opposite direction, and wherein the
   depth of each annular groove of the saw-tooth shaped profile has a ratio of approximately 1:20 to 1:50 to the maximum outside diameter of the peaks on said stub and wherein
   the steep tapering profile flanks form an angle of approximately 45° to 75° with a central axis of the rounded stub portion.

2. A stub according to claim 1 wherein the depth of each annual groove is 1 mm, and the long tapering conical profile flanks have an angle of approximately 30° with the central axis of the rounded stub portion and the groove peaks and valleys of the saw-tooth profile are rounded with a rounding radius of 1 mm which merge directly with one another on the steep tapering profile flanks which have an angle of approximately 60° with respect to the central axis of the stub.

* * * * *